Jan. 31, 1939.  W. H. GILLE  2,145,791

MOTOR

Filed March 17, 1937

Inventor
Willis H. Gille
By George H. Fisher
Atty.

Patented Jan. 31, 1939

2,145,791

UNITED STATES PATENT OFFICE 2,145,791

MOTOR

Willis H. Gille, St. Paul, Minn., assignor to Minneapolis-Honeywell Regulator Company, Minneapolis, Minn., a corporation of Delaware Application March 17, 1937, Serial No. 131,381

11 Claims. (Cl. 172—36)

My invention relates to the electric motor art and more particularly to a new and improved stator construction for a multi-pole motor.

An object of the present invention is to provide a stator structure for a multi-pole electric motor having substantially cylindrical coils in which the pole portions are so disposed that the available space for coils is more effectively utilized.

A further object of the present invention is to provide a stator structure for a multi-pole electric motor in which the pole portions are of uniform width throughout to permit the application over the end thereof of close fitting preformed coils, and extend at an angle to any radial line passing through the pole face thereof whereby a relatively long pole face is provided.

A further object of the present invention is to provide a multi-section stator structure in which the sections are interlocked through a joint easily assembled and provided with an extremely large contact area.

Further objects of the invention will be apparent from a consideration of the accompanying specification, claims and drawing, of which Figure 1 is a view partially schematic of my improved motor construction.

Figure 1:
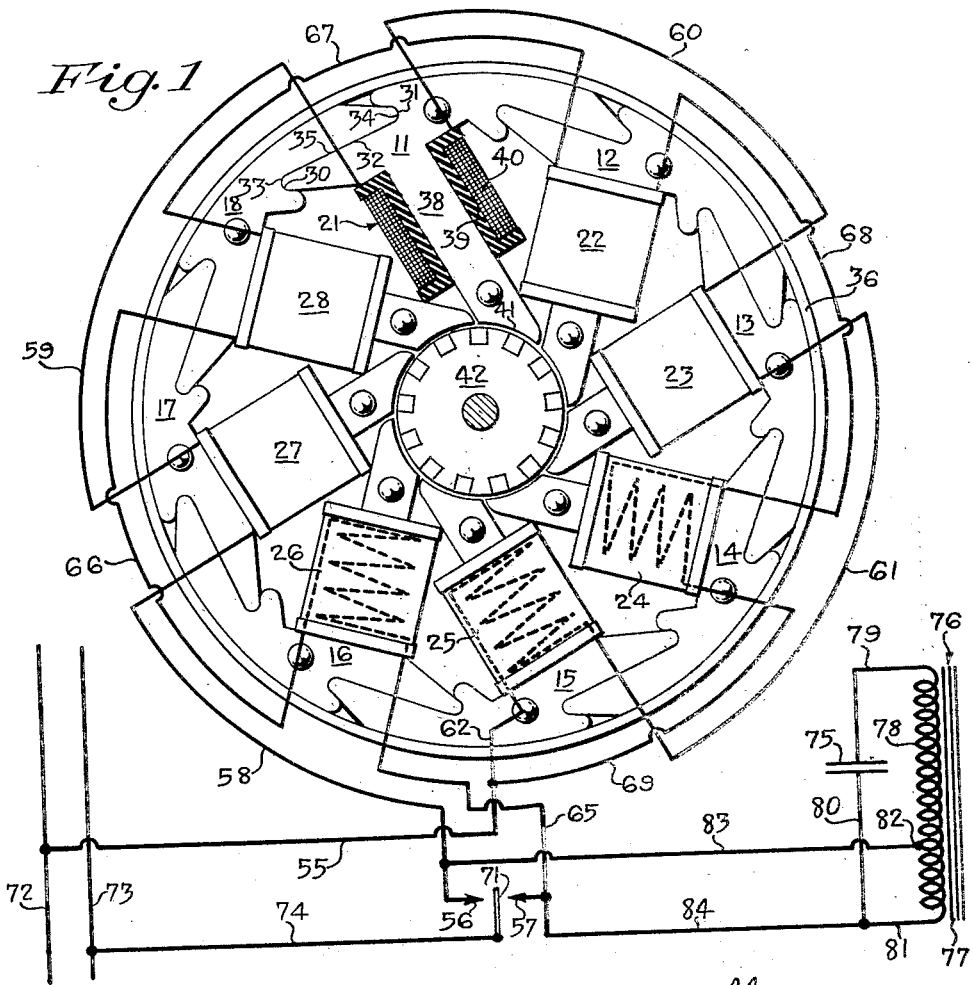

Referring to the drawing in greater detail, the stator of the motor is shown as formed of a number of core sections which are designated by the reference numerals 11 to 18 respectively. On each one of these core sections is a coil, these coils being designated by the reference numerals 21 to 28 respectively. The core 21 is shown in section so as to permit the core section 11 to be more clearly shown. The construction of the stator sections will be described in connection with section 11 although it is to be understood that the construction of each core section is the same. As will be noted from Figure 2, section 11 consists of a plurality of laminations which are secured together by rivets 29 or other suitable fastening means. The stator section consists of an arcuate portion and a pole portion. The left-hand end of the arcuate portion is provided with a tongue portion 30 and a groove 31. Extending between the tongue 30 and the groove 31 is a straight portion 32. The tongue 30, as will be noted from Figure 1, extends into a groove 33 in the right-hand end of the arcuate portion of section 18. Extending into the groove 31 of section 11 is a tongue 34, also on the right-hand end of section 18. Joining the tongue 34 and the groove 33 of section 18 is a straight portion 35 which engages the straight portion 32 of section 11. It will thus be noted that the two sections 11 and 18 are firmly interlocked and can only be separated by relative movement of the two parts in a circumferential direction.

Figure 2:
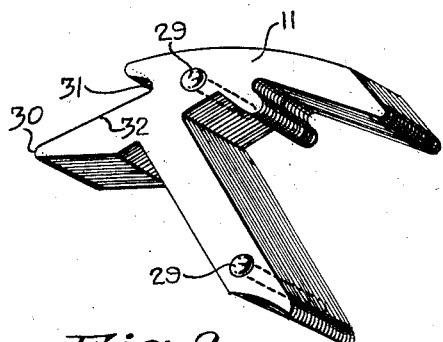
Figure 2 is a detailed view of one section of the stator core.

It will be noted from Figure 1 that the right-hand end of section 11 is formed in identically the same manner as the right-hand end of the arcuate portion of section 18. Similarly, the left-hand end of section 12 is formed in the same manner as the left end of section 11. Thus section 11 is interlocked with section 12 in the same manner as sections 11 and 18 are interlocked. Since, as previously stated, the various core sections 11 to 18 are all formed in an identical manner, it will be obvious that in their assembled form, as shown in Figure 1, the various core sections are firmly interlocked with one another and can be separated only by a relative movement of the sections in a circumferential direction. To prevent such movement a circular band 36 is tightly applied around the outside of the sections. It will be noted that the circular outline of the stator is not dependent upon the band 36 being exactly circular since by reason of the interlocked nature of the various sections these sections when tightly fitted together inherently assume a circular outline. Moreover, any radial inwardly directed force applied at any point on the circumference of the stator will not cause the core to be distorted from a circular shape as is true with certain prior art constructions.

Each of the sections 11 to 18 is provided with a pole portion. The pole portion of section 11 is designated by the reference character 38. It will be noted that this pole portion is of uniform width throughout, this permitting the application thereto over the inner end thereof of a closely fitting preformed coil. The coil 21, as indicated previously, is shown in Figure 1 in section. It will be noted that this coil consists of a spool 39 upon which is located a winding 40. It will further be noted that the inner dimensions of the spool 40 conform closely to the dimensions of the pole portion 38. In manufacturing this motor each coil is slipped over the pole portion of the individual section and then these sections with the coils assembled upon them are themselves assembled together.

As indicated in Figure 1 of the drawing, the pole portions 38 extend at a considerable angle to any radial line passing through the pole faces thereof, which pole face in the case of section 11 is indicated by the reference numeral 41. This angular location of the pole portions has two very definite advantages. In the first place it is possible to obtain a much better space factor so far as the relative space available for the coils is concerned. In the second place, a very long pole face is provided, thus reducing the reluctance of the air gap between the pole of the armature which is designated by the reference numeral 42.

Figure 3:
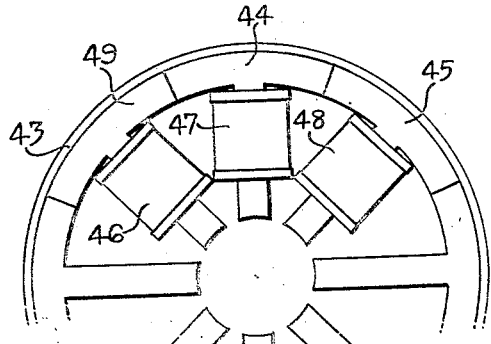
Figure 3 is a schematic representation of a prior art construction for the purpose of more clearly pointing out the advantages of applicant's construction.

The advantages of the present stator will be more readily understood by reference to Figure 3, wherein a conventional type of prior art stator is schematically shown. In this connection the three adjacently disposed stator sections are indicated by the reference numerals 43, 44 and 45. On these sections coils 46, 47 and 48 are located. A band 49 surrounds the various stator core sections and holds them in assembled relation. In this structure the various core sections are not interlocked as with the construction of the present invention. Moreover, the pole portions of the sections extend in a radial direction. It will readily be noted from this figure that applicant's construction has three very distinct advantages. In the first place, the stator construction is not a rigid one. Any inwardly directed force applied at any point of the circumference of the stator will cause the stator sections to slide with respect to one another. Even if they were interlocked by single tongues and grooves as has been sometimes proposed, the sections could so pivot with respect to one another that the device as a whole could assume a non-circular shape. This is avoided in applicant's construction by each section having a tongue and a groove joined by a relatively long straight portion and adapted to mate with corresponding complementary surfaces on contiguous sections.

The second advantage of applicant's construction, as previously pointed out, is the better space factor available. It will be noted from Figure 3 that a very large amount of the space between the core sections is unavailable for the windings. One very pronounced difficulty is that it is necessary for the end flanges of the spool to project slightly beyond the surface of the windings to prevent these windings from sliding off the end of the spool. In the arrangement of Figure 3, these end flanges abut one another thus materially limiting the length of the pole portion over which the spools can extend. Moreover, by reason of the fact that each pole portion is disposed diagonally to the radial line passing through the center of its pole face, it is possible to stagger the core sections and still have them all positioned in the same place on the pole sections of their respective sections. In this manner it is possible for these coil members to inter-fit with one another in such a manner that the available space is very efficiently utilized.

A third advantage of the present structure is that the pole face of the pole portion is relatively long as compared with the width of the pole portion. This will be obvious from a comparison of Figures 1 and 3. The only way in which it is possible to increase the pole faces in a stator like that of Figure 3 is to enlarge the ends of the pole portions of the stator. If this is to be done in a motor wherein preformed windings are to be used, it is necessary to have removable pole shoes, which adds greatly to the expense of a small motor. With applicant's angular disposition of the pole portions, the elongation of the pole face is made possible while still permitting the application of the coils over the inner end of the core sections.

The provision of the extra long pole face greatly reduces the reluctance of the air gap between the stator and the rotor. The reluctance of the magnetic circuit is further decreased by the fact that the area of juncture between the various stator sections is very large by reason of the irregular contours of the joining surfaces. Thus comparing Figures 1 and 3, it will be noted that instead of a relatively short radial joining area as in Figure 3, the construction of the present device has two curved areas joined by a relatively long flat area. Obviously such a joint has a much lower reluctance than one of the type shown in Figure 3.

While the stator construction which has been described is one which is desirable in many types of multipole electric motors, it has been found particularly desirable for use in a two-phase motor particularly of the capacitor type. In Figure 1 an improved stator construction is illustrated as employed in a motor of this type. A rotor 42 is shown as being of the squirrel cage type. Windings 27, 21, 23 and 25 are connected in series between a common lead 55 and a switch contact 56 by conductors 58, 59, 60, 61 and 62. Coils 26, 28, 22 and 24 are connected in series between a common lead 55 and a second switch contact 57 by conductors 65, 66, 67, 68 and 69. Coils 27, 21, 23 and 25 form the windings of one phase of the two-phase motor and coils 26, 28, 22 and 24 constitute the windings of the other phase. It is to be understood that the alternate windings of each phase are oppositely connected to provide for alternate poles being of opposite polarity.

The two switch contacts 56 and 57 previously referred to are adapted to be selectively engaged by a switch arm 71. Switch arm 71 and the contacts 56 and 57 cooperate to act as a reversing switch for the motor.

The common lead 55 previously referred to leads to a line wire 72. The switch blade 71 of the reverse switch is connected through conductor 74 to a second line wire 73. The two line wires 72 and 73 lead to any suitable source of A. C. power (not shown).

As previously indicated, the two-phase motor with which the stator construction is employed is of the capacitor type. A condenser 75 is employed to provide the capacitance effect and to cause the desired phase displacement between the two phases of the motor. If it were desired to employ a condenser of sufficient capacity it would be possible to connect condenser 75 directly across terminals 56 and 57. In view, however, of the fact that the capacity of the condenser can be materially reduced by increasing the voltage to which the condenser is subjected, an autotransformer 76 is employed. This autotransformer consists of a core 77 and a winding 78. The condenser 75 is connected across the outer terminals of the winding 78 through conductors 79, 80 and 81. The winding 78 is tapped at 82 to provide a primary portion. The tap 82 is connected through conductor 83 with switch contact 56. The lower end of winding 78 is connected through conductors 81 and 84 with the other switch contact 57. A portion of winding 78 between the lower end thereof and winding 82 constitutes a primary portion of the winding. It will thus be seen that the autotransformer operates as a step-up transformer causing the condenser 75 to be subjected to a relatively high voltage and thus reducing the capacity of the condenser necessary to produce the required phase shift. The presence of the condenser 75 in the secondary circuit can be considered as introducing the same effect as a condenser of larger capacity placed in the primary circuit.

The operation of the motor will now be traced. If switch blade 71 is moved into engagement with contact 57 the following energizing circuit is established to the windings of one phase: from line wire 73, through conductor 74, switch blade 71, contact 57, conductor 65, coil 26, conductor 66, coil 28, conductor 67, coil 22, conductor 68, coil 24 and conductors 69 and 55 to the other line wire 72. It will be noted that the windings of one phase are thus directly connected across the line wires 72 and 73. At the same time the following energizing circuit is established for the windings of the other phase: from line wire 73, through conductor 74, switch blade 71, contact 57, conductors 84 and 81, the primary portion of winding 78, conductors 83 and 58, coil 27, conductor 59, coil 21, conductor 60, coil 23, conductor 61, coil 25 and conductors 62 and 55 to the other line wire 72. It will thus be noted that this last named energizing circuit includes the primary portion of the winding 78 so that the phase of the current flowing through this last named energizing circuit is subjected to the capacity effect of condenser 75. The result of this is that the current through the last named circuit will lead in phase that through the first named circuit. The result will be that the rotor 42 will rotate in a given direction.

If the reversing switch blade 71 is now moved out of engagement with contact 57 and into engagement with contact 56 the following energizing circuit will be established: from line wire 73 through conductor 74, switch blade 71, switch contact 56, conductor 83, primary portion of winding 78, conductors 81 and 84, conductor 65, coil 26, conductor 66, coil 28, conductor 67, coil 22, conductor 68, coil 24 and conductors 69 and 55 to the other line wire 72. At the same time the following additional energizing circuit will be established: from line wire 73, through conductor 74, switch blade 71, contact 56, conductor 58, coil 27, conductor 59, coil 21, conductor 60, coil 23, conductor 61, coil 25 and conductors 62 and 55 to the other line wire 72. It will be noted that in the two circuits just traced, which are established by the engagement of switch blade 71 with contact 56, the energizing circuit for the phase including windings 26, 28, 22 and 24 now includes the primary portion of winding 78 so that this phase is now subjected to the capacitance effect of condenser 75. It will further be noted that the phase consisting of windings 27, 21, 23 and 25 is now energized directly from line wires 72 and 73. The result will be that the current through the first named phase will now lead that through the second named phase so that the rotor 42 will rotate in a direction opposite to that in which it rotated when switch blade 71 was in engagement with contact 57.

It will be noted that a very compact effective reversible capacitor motor is provided. The long pole faces combined with the very long faces of the joints between the stator sections results in an extremely low magnetic reluctance. It is desirable that this motor be employed in certain cases in apparatus wherein it is necessary to rotate the motor in a reverse direction through the action of a spring acting through a reduction gear train. In such cases it is very desirable that the resistance offered by the motor to turning be as low as possible. For this reason the motor 42 is made of relatively small diameter. This decreases the mass of the rotor which not only decreases the friction of the rotor on its bearings but also increases the inertia of the rotor. The small size of this motor has the further advantage that it increases the resistance thereof and causes the inductive reactance of the rotor to be small so that the change in the value thereof with the change in the speed of the rotor has less effect on the total inductive reactance of the windings so that the latter remains more nearly constant. In this manner, a starting torque which is relatively high with respect to the running torque, is obtained.

While I have shown the stator structure embodied in an improved capacitor motor it is to be understood that the various features of the stator construction, as previously indicated, are not limited to application to the capacitor motor art. As previously stated, the stator structure as described is one which is of general applicability to any polyphase motor.

In general, while I have described a specific embodiment of my invention it is to be understood that this is for purposes of illustration only and that the invention is to be limited only by the scope of the appended claims.

I claim as my invention:

1. In a multi-pole electric motor, a stator structure comprising a core having at least three pole portions, the axis of each extending at an angle to any radial line passing through the pole face thereof, and coils surrounding said pole portions and of sufficient size as to extend into close proximity with each other.

2. In a multi-pole electric motor, a stator structure having a core, comprising a plurality of assembled sections, each consisting of an arcuate portion and a pole portion having a uniform width throughout to permit the application of a relatively close fitting preformed coil over the inner end thereof, the axis of each of said pole portions extending at an angle to any radial line passing through the pole face thereof whereby the length of the pole face is materially greater than the width of the pole portion.

3. In a multi-pole electric motor, a stator structure formed of a plurality of sections, each section having a pole portion and a rim portion, each end of each rim portion having a tongue and a groove joined by a relatively long flat surface, said sections when assembled having the tongue and groove of each end of each section interlocked with the groove and tongue respectively of the adjacent end of the contiguous section and with the flat surfaces of the adjacent ends in abutting engagement with each other, whereby a rigid interlocked structure results.

4. In a multi-pole electric motor, a stator structure formed of three or more sections, each section having a pole portion and a rim portion, each end of each rim portion having a tongue and a groove joined by a relatively long flat surface, said sections when assembled having the tongue and groove of each end of each section interlocked with the groove and tongue respectively of the adjacent end of the contiguous section and with the flat surfaces of the adjacent ends in abutting engagement with each other, whereby a rigid interlocked structure results.

5. In a multi-pole electric motor, a stator structure formed of a plurality of sections, each section having a pole portion and an arcuate portion, each end of each arcuate portion having a tongue and a groove joined by a relatively long flat surface, said sections when assembled having the tongue and groove of each end of each section interlocked with the groove and tongue respectively of the adjacent end of the contiguous section and with the flat surfaces of the adjacent ends in abutting engagement with each other, whereby a rigid interlocked structure results, and said pole portions each extending at an angle to any radial line drawn through its pole face.

6. In a multi-pole electric motor, a stator structure formed of a plurality of sections, each section having a pole portion and an arcuate portion, each end of each arcuate portion having a tongue and a groove joined by a relatively long flat surface, said sections when assembled having the tongues and grooves of each end of each section interlocked with the grooves and tongues respectively of the adjacent end of the contiguous section and with the flat surfaces of the adjacent ends in abutting engagement with each other, whereby a rigid interlocked structure results, and said pole portions each being of uniform width throughout and extending at an angle to any radial line drawn through its pole face whereby a relatively long pole face is provided while permitting the application of a close fitting coil over the end thereof.

7. In a multi-pole electric motor, a stator structure formed of a plurality of sections, each section having a pole portion and an arcuate portion, each end of each arcuate portion having a tongue and a groove joined by a relatively long flat surface, said sections when assembled having the tongues and grooves of each end of each section interlocked with the grooves and tongues respectively of the adjacent end of the contiguous section and with the flat surfaces of the adjacent ends in abutting engagement with each other, whereby a rigid interlocked structure results, said pole portions each extending at an angle to any radial line passing through the pole face thereof, and coils surrounding said pole portions and of sufficient size as to extend into close proximity with each other.

8. In a multi-pole electric motor, a stator structure comprising a core having a plurality of pole portions having curved inner pole faces which collectively define a circular rotor opening, the axis of each of said pole portions extending at an angle to any radial line passing through the pole face thereof, whereby the length of the pole face is materially greater than the width of the pole portion.

9. In a multi-pole electric motor, a stator structure comprising a core having at least three pole portions having curved inner pole faces, which collectively define a circular rotor opening, each of said pole portions forming part of a separate section of the core and being of uniform width throughout to permit the application of a relatively close fitting preformed coil over the inner end thereof, the axis of each of said pole portions extending at an angle to any radial line passing through the pole face thereof, whereby the length of the pole face is materially greater than the width of the pole portion.

10. In a multi-pole electric motor, a stator structure comprising a multi-section core, each section consisting of an arcuate portion and a pole portion, said arcuate portion having elongated irregularly formed ends adapted to interlock with the ends of contiguous sections, said pole portion being of uniform width and extending at an angle to said arcuate portion such that when said sections are assembled each pole portion extends at an angle to any radial line passing through the pole face thereof, and a substantially cylindrical coil surrounding each pole portion, said coils being of such size that they extend substantially into engagement with each other.

11. In a multi-pole electric motor, a stator structure having at least three abutting interlocked sections, each comprising one pole portion, said sections each having an arcuate exterior surface whereby the assembled sections have a circular cylindrical form, and a band tightly surrounding said sections and maintaining them in assembled relationship.

WILLIS H. GILLE.